US012415542B2

(12) United States Patent
Mehta et al.

(10) Patent No.: US 12,415,542 B2
(45) Date of Patent: Sep. 16, 2025

(54) BECOME AN AV TEST OPERATOR AS A PASSENGER

(71) Applicant: GM Cruise Holdings LLC, San Francisco, CA (US)

(72) Inventors: Kunal Mehta, Redwood City, CA (US); Matthew Owen Pugh, Danville, CA (US); Miles Avery Bowman, San Mateo, CA (US); Moorissa Meritseba Tjokro, San Francisco, CA (US); Adam Thomas Chase, San Mateo, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 203 days.

(21) Appl. No.: 18/149,801

(22) Filed: Jan. 4, 2023

(65) Prior Publication Data
US 2024/0217550 A1  Jul. 4, 2024

(51) Int. Cl.
*B60W 60/00* (2020.01)
*B60W 50/10* (2012.01)
*B60W 50/14* (2020.01)

(52) U.S. Cl.
CPC ........ *B60W 60/0013* (2020.02); *B60W 50/10* (2013.01); *B60W 50/14* (2013.01); *B60W 2540/01* (2020.02); *B60W 2540/30* (2013.01)

(58) Field of Classification Search
CPC .. B60W 60/0013; B60W 50/10; B60W 50/14; B60W 2540/01; B60W 2540/30
See application file for complete search history.

(56) References Cited

U.S. PATENT DOCUMENTS

| | | | |
|---|---|---|---|
| 2021/0272394 A1* | 9/2021 | Cella | G06Q 50/40 |
| 2024/0112077 A1* | 4/2024 | Agrawal | G06N 5/02 |

\* cited by examiner

*Primary Examiner* — Thomas E Worden
*Assistant Examiner* — Christopher A Buksa
(74) *Attorney, Agent, or Firm* — Honigman LLP; Matthew H. Szalach; Jonathan P. O'Brien

(57) ABSTRACT

Systems and methods for obtaining passenger feedback during an autonomous vehicle (AV) ride are provided. Feedback can be obtained in different forms during the passenger's ride. For instance, the passenger may opt-in to shadow the AV as it performs various driving behaviors. Input devices such as a tablet or joystick may be activated in the autonomous vehicle. A heuristic scene is selected and presented on the tablet, and the passenger can use the joystick to perform the maneuver as the AV is performing the same. The passenger's driving behavior does not alter the operation of the AV. Alternatively, the scene is different from the AV's route and the driving behaviors are not synced. Further, the passenger can be prompted to provide a response after specific maneuvers are performed by the AV. Feedback data is obtained and recorded from each passenger and then evaluated and compared to the AV's driving behaviors.

17 Claims, 6 Drawing Sheets

BECOME AN AV TEST OPERATOR AS A PASSENGER

TECHNICAL FIELD

The present disclosure generally relates to autonomous vehicles and, more specifically, to systems and methods for comparing passenger behavior with AV behavior.

BACKGROUND

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

Autonomous vehicles can be used to provide rides to passengers which means they are navigating roadways, following traffic signs and speed limits, and responding to other vehicles, pedestrians, and jaywalkers. Passengers can use a mobile app to schedule their rides and after each ride is over, the passengers can leave comments about their experience. In some instances, the comments may not be clear, or the reader may not be aware of other circumstances that could be relate to the passenger's comments.

SUMMARY

Systems and methods are provided for recording passenger driving behavior by way of obtaining passenger feedback and then comparing it to autonomous vehicle behavior. By doing so, the driving behavior of the autonomous vehicle may be adjusted or enhanced by becoming aware of additional human driving behaviors. In some examples, a passenger is offered to use an input device in the autonomous vehicle to perform a controlled maneuver by following a simulated scene presented on a screen in the autonomous vehicle. In other examples, a passenger can be prompted after the autonomous vehicle performs a maneuver to determine whether the passenger felt comfortable with the maneuver—choose yes or no. Additional prompts may follow for that maneuver depending on the passenger's initial response. Participating passengers may earn special status for providing valid feedback or reward incentives to continue to participate in providing feedback.

According to one aspect, a system for obtaining passenger feedback during a ride in an autonomous vehicle is provided and includes an onboard controls system which controls operation of the autonomous vehicle, whereby the onboard controls system includes an autonomous vehicle shadow component that selects at least one heuristic scene based at least in part on a map corresponding to a route that the autonomous vehicle, presents the at least one scene to a passenger in the autonomous vehicle, prompts the passenger to perform a driving behavior according to the at least one heuristic scene, and records the passenger's driving behavior feedback wherein the passenger's driving behavior feedback is compared to the driving behavior of the autonomous vehicle, and an autonomous vehicle feedback component that prompts the passenger to enter feedback about at least one driving behavior after it has been performed by the autonomous vehicle during the passenger's ride, wherein the feedback is analyzed according to the at least one driving behavior to assess operation of the vehicle.

According to one aspect, an autonomous vehicle configured for obtaining passenger feedback during a ride in the autonomous vehicle is provided and includes an onboard controls system which controls operation of the autonomous vehicle, whereby the onboard controls system includes an autonomous vehicle shadow component that selects at least one heuristic scene based at least in part on a map corresponding to a route that the autonomous vehicle, presents the at least one scene to a passenger in the autonomous vehicle, prompts the passenger to perform a driving behavior according to the at least one heuristic scene, and records the passenger's driving behavior feedback wherein the passenger's driving behavior feedback is compared to the driving behavior of the autonomous vehicle, and an autonomous vehicle feedback component that prompts the passenger to enter feedback about at least one driving behavior after it has been performed by the autonomous vehicle during the passenger's ride, wherein the feedback is analyzed according to the at least one driving behavior to assess operation of the vehicle.

According to another aspect, a method for obtaining passenger feedback during an autonomous vehicle ride is provided and includes picking up a passenger, requesting the passenger to opt-in to provide feedback during the autonomous vehicle ride, wherein requesting the feedback includes selecting at least one heuristic scene based at least in part on a map corresponding to a route that the autonomous vehicle, presenting the at least one scene to the passenger, prompting the passenger to perform a driving behavior according to the at least one heuristic scene to yield the feedback, recording the passenger's feedback and comparing the passenger's feedback to corresponding driving behavior of the autonomous vehicle.

According to a further aspect, a method for obtaining passenger feedback during an autonomous vehicle ride comprising prompting a passenger with a question to obtain feedback about at least one driving behavior after it has been performed by the autonomous vehicle during the passenger's ride; and recording the passenger's response to the question; wherein the feedback is analyzed according to the at least one driving behavior to assess operation of the vehicle.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Systems and methods are provided for passengers to provide feedback in various forms during their ride in an autonomous vehicle, which effectively allows them to become an autonomous vehicle test operator. Passenger feedback can come in different forms. For example, one form can involve permitting a passenger to do controlled shadow maneuvers while not affecting operation of the autonomous vehicle. The maneuvers may be similar to or the same as those being performed by the autonomous vehicle at that time or at a different time. As a result, the autonomous vehicle driving behavior can be compared to human driving behavior.

Another form involves obtaining and recording passenger feedback following an autonomous vehicle (AV) maneuver. For instance, the passenger may receive a prompt or question after the autonomous vehicle maneuvers to avoid a double-parked car to ask the passenger if the maneuver was comfortable for the passenger. This feedback is recorded after or in close time upon completion of the maneuver. Passenger prompts may be associated with selected maneuvers and/or in the presence of other existing factors such as road and weather conditions, people outside of the autonomous vehicle, high traffic areas or no-traffic areas.

Passenger feedback along with passenger data can be stored and overtime, some passengers may be deemed as a trusted test operator, whereby their feedback is sought more frequently. Providing valid feedback can also earn loyalty points for the passenger as further explained below.

Figure 1:
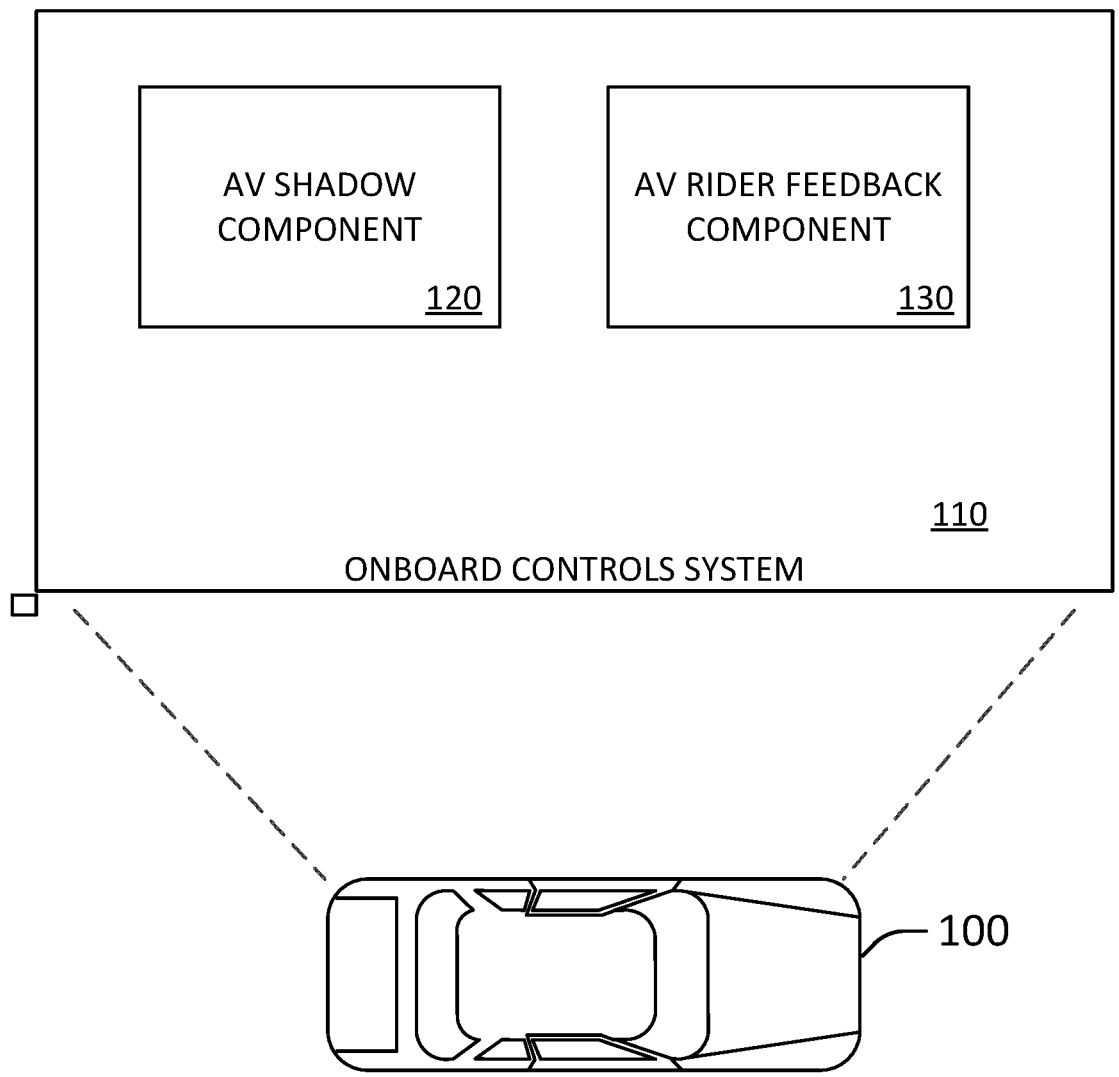
FIG. 1 illustrates a system for obtaining passenger feeding during a ride in an autonomous vehicle according to some examples of the present disclosure.

FIG. 1 is a diagram of a system 100 for obtaining passenger feedback during a ride in an autonomous vehicle, wherein the system includes an onboard controls system 110. The onboard controls system 110 controls operation of the autonomous vehicle as well as communications with a remote operations center (not pictured). The onboard controls system 110 comprises an AV shadow component 120 and an AV rider feedback component 130, both of which collect and record passenger/rider feedback and communicate it the onboard controls system. The feedback data can also be communicated to the remote operations center for additional analysis and/or storage for later use.

The AV shadow and rider feedback components 120, 130 can communicate with the passenger by way of a touch-enabled tablet or other computing device in the autonomous vehicle or by way of an interactive ride-sharing app on the passenger's mobile device. Other hardware installed in the autonomous vehicle can also be used to receive passenger input. Examples include a joystick or a wheel. Before requesting specific passenger input, the shadow and feedback components request that the passenger opt-in to participate. Participation may be tied to a rewards program or resemble a game-like environment with points, levels and prizes (e.g., discounts on future rides, retailer/sponsored discounts etc.).

The AV shadow component 120 presents one or more heuristic scenes wherein each scene may represent a particular driving behavior. Examples of driving behaviors include but are not limited to unprotected left turn, right turn on red, crowded intersections (e.g., with people, cars, electric scooters, and/or bike riders), interactions with jaywalkers, temporary lane closure, and multiple double-parked vehicles.

Once a passenger has opted in, the passenger can be presented with at least one simulated scene which involves a driving scenario such as making a right turn on red. The scene may include a car in motion with a right turn on red at the upcoming intersection. The passenger is asked to perform the maneuver in the scene such as by using the joystick or wheel. The AV shadow component 120 can capture the turn as made by a human performing the maneuver. In some instances, the speed of the car in the scene is fixed (e.g., the car is stopped at the red light) to minimize variables and to only capture how the human handles the right turn on red. In other instances, the scene could be expanded to include the car's approach to the red light and one or more additional variables can be included for the human to adjust as desired. Those settings could also be recorded such as timing of slowing down, rate of speed deceleration approaching the intersection, amount of time at a stop, sharpness of the turn, distance between the car and the curb, distance between the car and a leading car, and the like.

The simulated scenes may or may nor correlate to the route that the autonomous vehicle is following in real life or to the maneuvers that the autonomous vehicle is performing at the same time or at any time during the passenger's ride. Passenger maneuvers performed in the scenes do not affect operation of the autonomous vehicle in real time. Rather, the passenger driving behaviors are recorded and used for later comparison with the driving behaviors of the autonomous vehicle.

The AV rider feedback component 130 records a different type of passenger feedback. During the passenger's ride, the AV rider feedback component 130 can prompt the passenger about specific a driving behavior that the autonomous vehicle just performed. Rather than relying on post-ride feedback, the AV rider feedback component 130 requests feedback nearly at the same time as or immediately after experiencing the AV driving behavior. For example, the autonomous vehicle may need to change lanes due to a temporary lane closure. Using the tablet device in the autonomous vehicle or the app on the passenger's mobile device, the question: "Was the lane change maneuver comfortable?" can be displayed on the device screen. The passenger is asked to respond with selecting either YES or NO or something similar such as an icon or graphic (e.g., smiling face, frowning face). This data is collected and evaluated alongside detailed aspects of the autonomous vehicle driving behaviors that were performed and can be used to improve remote assistance behaviors.

An autonomous vehicle can also be configured to obtain passenger feedback during a ride in the autonomous vehicle and include the system as described in FIG. 1.

Figure 2:
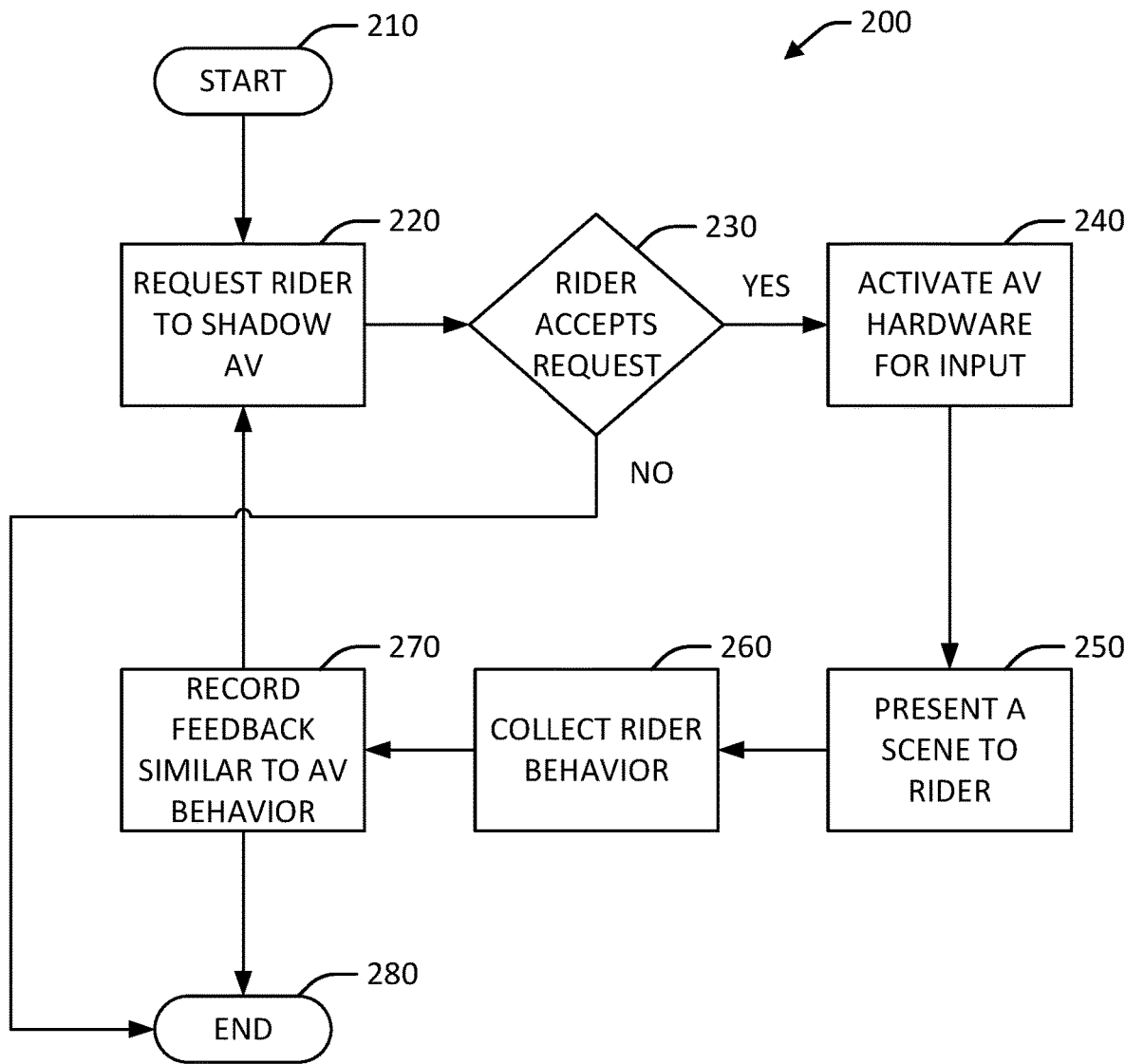
FIG. 2 is a diagram illustrating a method for allowing a passenger to provide maneuver input during an autonomous vehicle ride, according to some examples of the present disclosure.

FIG. 2 is a diagram illustrating a method 200 for obtaining passenger feedback by allowing the passenger to perform controlled maneuvers. The method involves simulated scenes that are generated for specific driving behaviors. Human driving behaviors can be observed via the scenes and then compared with autonomous vehicle driving behaviors in similar or identical scenes.

Either before the passenger ride begins or during the passenger's ride, the method 200 starts at 210 by requesting the rider to shadow driving behaviors at 220. If the rider accepts the request at 230, then the input devices (hardware) are activated in the autonomous vehicle at 240. These may include a tablet device, a joystick or a wheel for capturing rider input. At 250, the tablet may present a scene generated by a shadow feedback component (see FIG. 1). The scene represents a simulation of a specific driving behavior such as an unprotected left turn. The scene prompts the rider to use the joystick or wheel to perform the maneuver. The driving behavior of the rider is recorded at 260 for that scene and can be compared to the autonomous vehicle performing a similar maneuver in that same scene or a similar scene. In practice, multiple riders could provide feedback for the same scene and that data would then be analyzed to yield an average or consensus human driving behavior.

The scene prompt provided on-screen to the rider is separate from the rider's ongoing ride. That is, the rider's driving behavior captured in response to the scene does not affect the autonomous vehicle's behavior in the current ride. However, the scene selected for the rider to maneuver may mirror or be virtually identical to the current driving behavior that the autonomous vehicle is currently performing. The scene could be the same street or could be following the same route that the autonomous vehicle is taking in real life. In some instances, the rider is not permitted to change the route or the map shown in the scene. Further, the rider cannot change the requested driving behavior. In other instances, the rider could be allowed to select from at least two scenes which represent different driving behaviors.

At 270, the rider's feedback is communicated to the onboard controls system (see FIG. 1) and remote operations as needed for further evaluation. In some instances, only the feedback that is similar to AV driving behavior is recorded and transmitted to other systems. Passenger behavior feedback that deviates or substantially different from AV driving behavior can be discarded. The method can end at 280 or the rider can receive another request to provide feedback at 220 and receive a different scene prompt from the prior scene(s) completed. If the rider does not accept the next request, then the method ends at 280.

Figure 3:
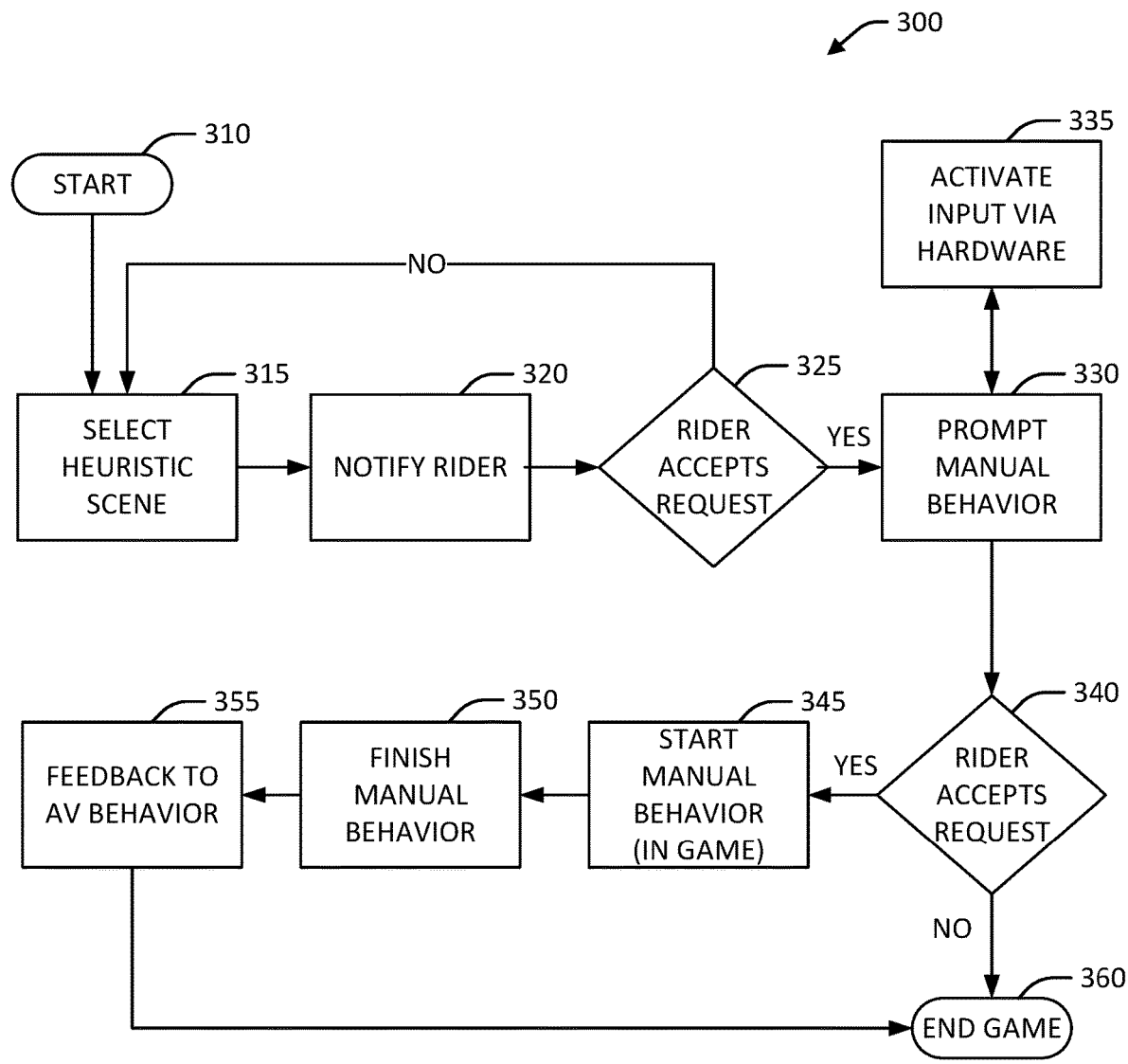
FIG. 3 is a diagram illustrating a method for allowing a passenger to provide maneuver input during an autonomous vehicle ride, according to some examples of the present disclosure.

FIG. 3 is a diagram illustrating a method 300 for obtaining passenger feedback by allowing the passenger to perform controlled maneuvers in a game-like environment. The feedback is obtained during the passenger's ride in the autonomous vehicle. Therefore, the length of the game is determined to be shorter than the estimated length of the passenger's ride. The game-like environment for obtaining passenger feedback may encourage passenger participation. In some instances, points, levels and nominal prizes may be offered which would be given as a result of participation and completion of each request.

The method 300 starts at 310 where a heuristic scene is selected at 315 and displayed to the rider. The scene can be selected by a heuristic scene selector which selects scenes before the rider is notified based on semantic map inputs as well as the environment variables to determine which scenes would be interesting from which to take human input. The scenes can be determined according to map features like right turn on red and unprotected left turns or based on environment features like heavy traffic intersections, EMV interactions, pedestrian crowds, jaywalkers, and double-parked vehicles.

The rider receives a notification at 320 displayed on an onboard tablet monitor. The notification indicates that there is an interesting scene in which they can shadow the autonomous vehicle. In addition, the notification requests the rider to participate in providing feedback about AV driving behavior in a video game of driving scenarios/scenes. If the rider does not accept the request, then the method returns to selecting a scene at 315. The rider may view a preview of the selected scene and not wish to participate. When the next scene is selected, the rider may accept that request at 325 and proceed through the method 300.

When the request is accepted at 325, manual driving behavior is prompted to the rider at 330, which also activates input hardware at 335. Examples of input hardware include a tablet, joystick or wheel in the autonomous vehicle that are configured to receive the rider's driving behavior for each scene. The ride-scheduling app on the rider's mobile device can also be used to receive rider input. The app can also be activated at 335 after the rider accepts the request and manual behavior is prompted to the rider.

If the rider accepts the request at 340, then manual behavior is initiated at 345 in the game and then finished at 350. Feedback in the form of the rider's driving behavior similar to the autonomous vehicle behavior is recorded at 355 and the game ends at 360. While in the game, the rider may provide feedback by shadowing the autonomous vehicle's behavior via one or more selected scenes. The rider may reject a scene and if so, another scene is prompted to the rider.

Rider feedback that deviates from the expected driving behavior associated with the scene can be discarded or ignored. For example, if a scene involves a right turn on red and the rider makes a left turn using the joystick, that feedback is discarded since it deviated from the expected driving behavior and maneuver according to the scene. Similarly, rider feedback that is substantially different from the driving behavior of the autonomous vehicle is also discarded.

Figure 4:
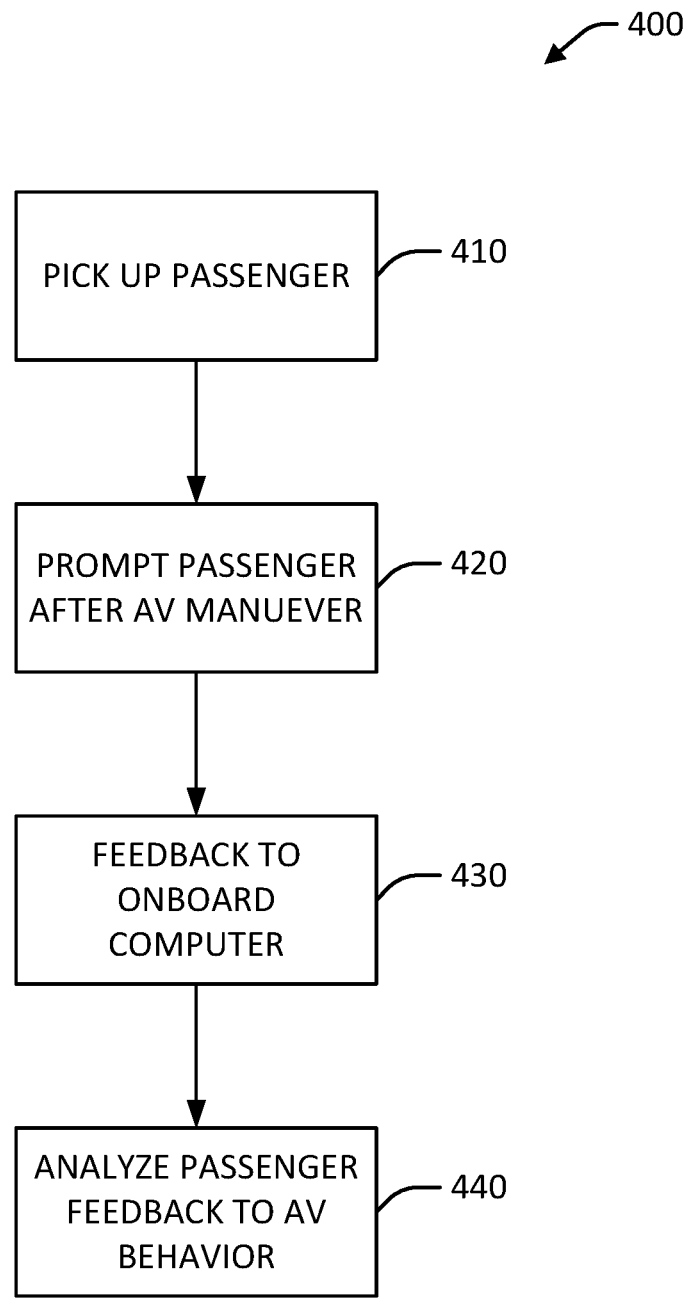
FIG. 4 is a diagram illustrating a method for allowing a passenger to provide maneuver input during an autonomous vehicle ride, according to some examples of the present disclosure.

Turning now to FIG. 4, a diagram of a method 400 for obtaining rider feedback is illustrated. The method involves prompting a passenger soon after the autonomous vehicle performs a maneuver or exhibits a driving behavior. The method 400 begins with picking up the passenger at 410 and the ride proceeds. The passenger can then be prompted at 420 during the ride after the autonomous vehicle performs a maneuver such as going around two double-parked cars. The prompt may be displayed on a tablet screen in the autonomous vehicle or on the passenger's mobile phone—such as via the app used to schedule the ride. The prompt can include a question such as: "Was the move around the double-parked cars comfortable?" At 430, the passenger responds to the prompt and that feedback is communicated to an onboard computer and elsewhere for further analysis at 440. The autonomous vehicle maneuvers and the corresponding passenger feedback about those maneuvers or driving behaviors can be compared and used to improve or provide more information to remote assistance systems.

Figure 5A:
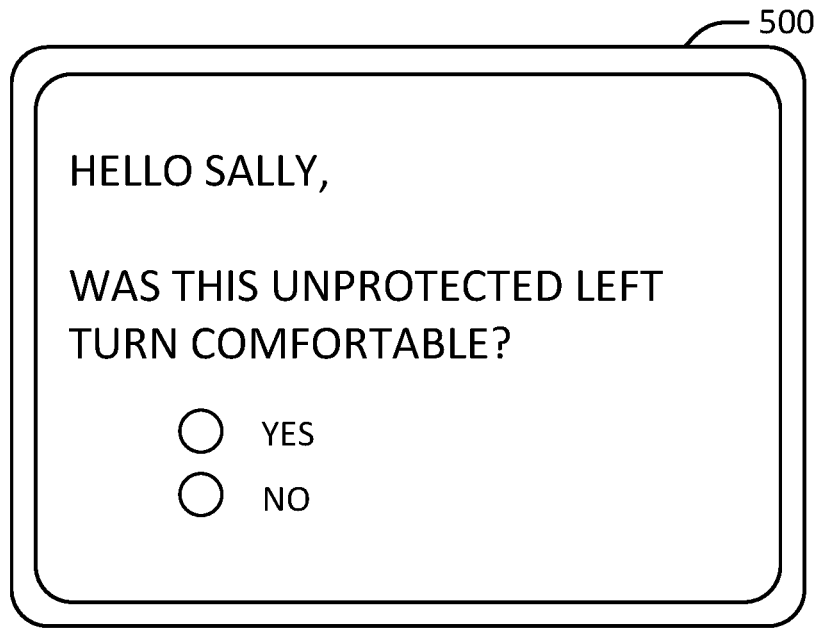
FIGS. 5A and 5B are diagrams illustrating example displays for obtaining passenger feedback, according to some examples of the present disclosure.
Figure 5B:
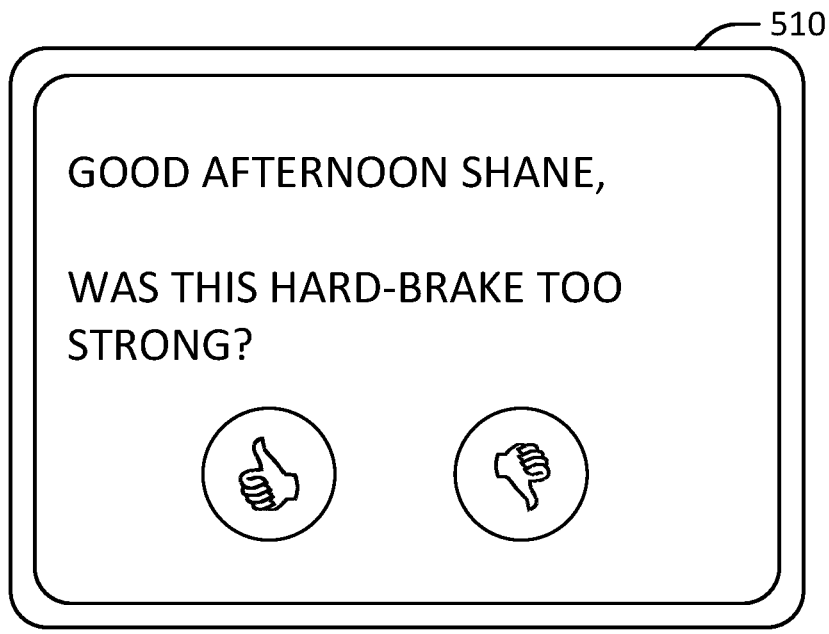

FIGS. 5A and 5B illustrate example feedback prompts as described above in FIGS. 1 and 4. In FIG. 5A, a display 500 is provided which can be on a tablet or mobile device. The display 500 presents a prompt or question to a passenger after the autonomous vehicle demonstrates a driving behavior by performing a maneuver. In this example, the autonomous vehicle has made an unprotected left turn. On the display 500, the passenger can be addressed by name and asked: Was this unprotected left turn comfortable? Response options YES and NO are provided on the display and the passenger selects one response.

Display 510 in FIG. 5B is an alternative presentation of a prompt requesting passenger feedback. In this example, the display 600 also greets the passenger by name and provides symbols to indicate the passenger's response (e.g., thumbs up, thumbs down). The responses are recorded and then used to enhance remote assistance systems.

Figure 6:
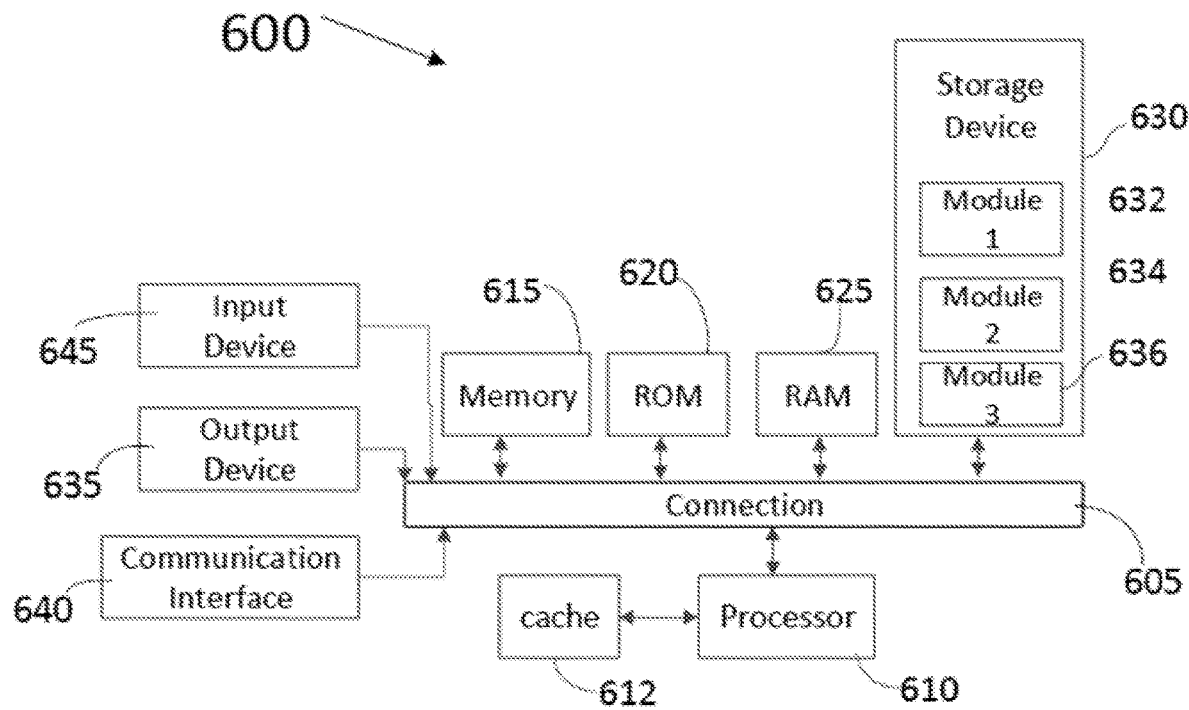
FIG. 6 illustrates an example processor-based system with which some aspects of the subject technology can be implemented.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some embodiments, a hardware service that performs a particular function can include the software component stored in a computer-readable medium in connection with the necessary hardware components, such as processor 610, connection 605, output device 635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Select Examples

Example 1 provides for a system for obtaining passenger feedback during an autonomous vehicle ride comprising an onboard controls system which controls operation of an autonomous vehicle, the onboard controls system comprising an autonomous vehicle shadow component that selects at least one heuristic scene based at least in part on a map corresponding to a route that the autonomous vehicle, presents the at least one scene to a passenger in the autonomous vehicle, prompts the passenger to perform a driving behavior according to the at least one heuristic scene, and records the passenger's driving behavior feedback wherein the passenger's driving behavior feedback is compared to the driving behavior of the autonomous vehicle; and an autonomous vehicle feedback component that prompts the passenger to enter feedback about at least one driving behavior after it has been performed by the autonomous vehicle during the passenger's ride, wherein the feedback is analyzed according to the at least one driving behavior to assess operation of the vehicle.

Example 2 provides a system according to one or more of the preceding and/or following examples, including that the at least one heuristic scene is selected based on driving behaviors anticipated along the route.

Example 3 provides a system according to one or more of the preceding and/or following examples, including that the at least one heuristic scene presented to the passenger coincides with the route of the autonomous vehicle.

Example 4 provides a system according to one or more of the preceding and/or following examples, including one or more input devices that the passenger uses to provide the passenger driving behavior feedback and the autonomous driving behavior feedback.

Example 5 provides a system according to one or more of the preceding and/or following examples, including that the input devices comprise a touch-enabled computing device and a joystick.

Example 6 provides a system according to one or more of the preceding and/or following examples, including wherein the at least one driving behavior comprises one of a right turn on red, an unprotected left turn, interactions with pedestrians, interactions with jaywalkers, one or more double-parked vehicles, temporary lane closures requiring a merge or lane change, congested intersections and interactions that may require a quicker change in speed.

Example 7 provides a system according to one or more of the preceding and/or following examples, including, wherein the passenger's driving behavior according to the at least one scene does not affect operation of the autonomous vehicle.

Example 8 provides a system according to one or more of the preceding and/or following examples, including that the passenger's driving behavior feedback is discarded when it deviates from the autonomous vehicle driving behavior.

Example 9 provides a method for obtaining passenger feedback during a ride in an autonomous vehicle comprising: picking up a passenger; requesting the passenger to opt-in to provide feedback during the autonomous vehicle ride, wherein requesting the feedback comprises selecting at least one heuristic scene based at least in part on a map corresponding to a route that the autonomous vehicle; presenting the at least one scene to the passenger; prompting the passenger to perform a driving behavior according to the at least one heuristic scene to yield the feedback; recording the passenger's feedback; and comparing the passenger's feedback to corresponding driving behavior of the autonomous vehicle.

Example 10 provides a method according to one or more of the preceding and/or following examples, including that the at least one heuristic scene is selected based on driving behaviors anticipated along the route.

Example 11 provides a method according to one or more of the preceding and/or following examples, including that the at least one heuristic scene presented to the passenger coincides with the route of the autonomous vehicle.

Example 12 provides a method according to one or more of the preceding and/or following examples, including activating one or more input devices that the passenger uses to provide the feedback.

Example 13 provides a method according to one or more of the preceding and/or following examples, including that the input devices comprise a touch-enabled computing device and a joystick.

Example 14 provides a method according to one or more of the preceding and/or following examples, including that the at least one driving behavior comprises a right turn on red, an unprotected left turn, interactions with pedestrians, interactions with jaywalkers, one or more double-parked vehicles, temporary lane closures requiring a merge or lane change, congested intersections and interactions that may require a quicker change in speed.

Example 15 provides a method according to one or more of the preceding and/or following examples, including that the passenger's driving behavior according to the at least one scene does not affect operation of the autonomous vehicle.

Example 16 provides a method according to one or more of the preceding and/or following examples, including that the passenger's feedback is discarded when it deviates from a corresponding autonomous vehicle driving behavior.

Example 17 provides a method according to one or more of the preceding and/or following examples, including that the at least one scene is presented in a game environment and optionally rewarding one or more incentives for providing the feedback to the at least one scene.

Example 18 provides a method for obtaining passenger feedback during an autonomous vehicle ride including prompting a passenger with a question to obtain feedback about at least one driving behavior after it has been performed by the autonomous vehicle during the passenger's ride; and recording the passenger's response to the question; wherein the feedback is analyzed according to the at least one driving behavior to assess operation of the vehicle.

Example 19 provides a method according to one or more of the preceding and/or following examples, including that the at least one driving behavior comprises a right turn on red, an unprotected left turn, interactions with pedestrians, interactions with jaywalkers, one or more double-parked vehicles, temporary lane closures requiring a merge or lane change, congested intersections and interactions that may require a quicker change in speed.

Example 20 provides a method according to one or more of the preceding and/or following examples, including further comprising activating a mobile computing device to display the question to the passenger, wherein the mobile computing device is one of a tablet computing device in the autonomous vehicle or the passenger's mobile device.

Example 21 provides an autonomous vehicle configured to obtain passenger feedback during a ride in the autonomous vehicle, comprising: an onboard controls system which controls operation of an autonomous vehicle, the onboard controls system comprising an autonomous vehicle shadow component that selects at least one heuristic scene based at least in part on a map corresponding to a route that the autonomous vehicle, presents the at least one scene to a passenger in the autonomous vehicle, prompts the passenger to perform a driving behavior according to the at least one heuristic scene, and records the passenger's driving behavior as feedback wherein the passenger's feedback is compared to the driving behavior of the autonomous vehicle; and an autonomous vehicle feedback component that prompts the passenger with a question to respond with opinion feedback about at least one driving behavior after it has been performed by the autonomous vehicle during the passenger's ride, wherein the feedback is analyzed according to the at least one driving behavior to assess operation of the vehicle.

Example 22 provides an autonomous vehicle according to one or more of the preceding and/or following examples, including that the opinion feedback is a yes/no response to the question.

Example 23 provides an autonomous vehicle according to one or more of the preceding and/or following examples, including that the at least one heuristic scene is selected based on driving behaviors anticipated along the route.

Example 24 provides an autonomous vehicle according to one or more of the preceding and/or following examples, including that the at least one heuristic scene presented to the passenger coincides with the route of the autonomous vehicle.

Example 25 provides an autonomous vehicle according to one or more of the preceding and/or following examples, including one or more input devices that the passenger uses to provide the passenger driving behavior feedback and the autonomous driving behavior feedback.

Example 26 provides an autonomous vehicle according to one or more of the preceding and/or following examples, including that the input devices comprise a touch-enabled computing device and a joystick.

Example 27 provides an autonomous vehicle according to one or more of the preceding and/or following examples, including wherein the at least one driving behavior comprises one of a right turn on red, an unprotected left turn, interactions with pedestrians, interactions with jaywalkers, one or more double-parked vehicles, temporary lane closures requiring a merge or lane change, congested intersections and interactions that may require a quicker change in speed.

Example 28 provides an autonomous vehicle according to one or more of the preceding and/or following examples, including, wherein the passenger's driving behavior according to the at least one scene does not affect operation of the autonomous vehicle.

Example 29 provides an autonomous vehicle according to one or more of the preceding and/or following examples, including that the passenger's driving behavior feedback is discarded when it deviates from the autonomous vehicle driving behavior.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A system for obtaining passenger feedback during a ride in an autonomous vehicle comprising:

an onboard controls system which controls operation of the autonomous vehicle to pickup a passenger, the onboard controls system comprising:

an autonomous vehicle shadow component that selects at least one heuristic scene based at least in part on a map corresponding to a route that the autonomous vehicle is traversing in a real-world environment, presents the at least one scene to the passenger in the autonomous vehicle in a simulated environment, prompts the passenger to perform a driving behavior according to the at least one heuristic scene in the simulated environment, and records the passenger's driving behavior feedback, wherein the passenger's driving behavior feedback in the simulated environment is compared to the driving behavior of the autonomous vehicle while the autonomous vehicle is traversing the heuristic scene in the real-world environment; and an autonomous vehicle feedback component that prompts the passenger to enter feedback about at least one driving behavior after it has been performed by the autonomous vehicle during the passenger's ride, wherein the feedback is analyzed according to the at least one driving behavior to assess operation of the vehicle, wherein the autonomous vehicle is providing transportation for a plurality of passengers, including the passenger, and feedback based on the at least one heuristic scene from each of the plurality of passengers is recorded and collectively averaged to provide a consensus feedback from the plurality of passengers for the at least one heuristic scene, wherein the consensus feedback is compared to the behavior of the autonomous vehicle while the autonomous vehicle is traversing the heuristic scene in the real-world environment.

2. The system of claim 1, wherein the at least one heuristic scene is selected based on driving behaviors anticipated along the route.

3. The system of claim 1, wherein the at least one heuristic scene presented to the passenger coincides with the route of the autonomous vehicle.

4. The system of claim 1, further comprising one or more input devices that the passenger uses to provide the passenger driving behavior feedback and the autonomous driving behavior feedback.

5. The system of claim 4, wherein the one or more input devices comprise a joystick.

6. The system of claim 1, wherein the at least one driving behavior comprises one of a right turn on red, an unprotected left turn, interactions with pedestrians, interactions with jaywalkers, one or more double-parked vehicles, temporary lane closures requiring a merge or lane change, congested intersections and interactions that may require a quicker change in speed.

7. The system of claim 1, wherein the passenger's driving behavior according to the at least one scene does not affect operation of the autonomous vehicle.

8. The system of claim 1, wherein the passenger's driving behavior feedback is discarded when it deviates from the autonomous vehicle driving behavior.

9. A method for obtaining passenger feedback during an autonomous vehicle ride comprising:

picking up a passenger;

requesting the passenger to opt-in to provide feedback during the autonomous vehicle ride, wherein requesting the feedback comprises:

selecting at least one heuristic scene based at least in part on a map corresponding to a route that the autonomous vehicle is traversing in a real-world environment;

presenting the at least one scene to the passenger in a simulated environment;

prompting the passenger to perform a driving behavior according to the at least one heuristic scene in the simulated environment to yield the feedback;

recording the passenger's feedback; and comparing the passenger's feedback in the simulated environment to corresponding driving behavior of the autonomous vehicle while the autonomous vehicle is traversing the heuristic scene in the real-world environment, wherein the autonomous vehicle is providing transportation for a plurality of passengers, including the passenger, and feedback based on the at least one heuristic scene from each of the plurality of passengers is recorded and collectively averaged to provide a consensus feedback from the plurality of passengers for the at least one heuristic scene, wherein the consensus feedback is compared to the behavior of the autonomous vehicle while the autonomous vehicle is traversing the heuristic scene in the real-world environment.

10. The method of claim 9, wherein the at least one heuristic scene is selected based on driving behaviors anticipated along the route.

11. The method of claim 9, wherein the at least one heuristic scene presented to the passenger coincides with the route of the autonomous vehicle.

12. The method of claim 9, further comprising activating one or more input devices that the passenger uses to provide the feedback.

13. The method of claim 12, wherein the input devices comprise a touch-enabled computing device and a joystick.

14. The method of claim 9, wherein the at least one driving behavior comprises a right turn on red, an unprotected left turn, interactions with pedestrians, interactions with jaywalkers, one or more double-parked vehicles, temporary lane closures requiring a merge or lane change, congested intersections and interactions that may require a quicker change in speed.

15. The method of claim 9, wherein the passenger's driving behavior according to the at least one scene does not affect operation of the autonomous vehicle.

16. The method of claim 9, wherein the passenger's feedback is discarded when it deviates from a corresponding autonomous vehicle driving behavior.

17. The method of claim 9, wherein the at least one scene is presented in a game environment, including rewarding one or more incentives for providing the feedback to the at least one scene.

* * * * *